(12) United States Patent
Roberts et al.

(10) Patent No.: US 8,701,731 B2
(45) Date of Patent: *Apr. 22, 2014

(54) TRANSFER RING HAVING ADVANTAGED CAM FOLLOWER-CAMMING GROOVE ASPECT AND METHOD

(75) Inventors: Clark A. Roberts, Maryville, TN (US); Sean E. Howley, Maryville, TN (US)

(73) Assignee: Davian Enterprises, LLC, Greenback, TN (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/313,337

(22) Filed: Dec. 7, 2011
(Under 37 CFR 1.47)

(65) Prior Publication Data
US 2012/0256434 A1    Oct. 11, 2012

Related U.S. Application Data

(63) Continuation-in-part of application No. 12/166,564, filed on Jul. 2, 2008, now Pat. No. 8,091,602.

(51) Int. Cl.
*B29D 30/26*    (2006.01)

(52) U.S. Cl.
USPC ..................... 156/406.2; 156/126

(58) Field of Classification Search
USPC ................ 156/126, 406.2, 417, 420; 425/38; 249/162
See application file for complete search history.

(56) References Cited

U.S. PATENT DOCUMENTS

| | | | |
|---|---|---|---|
| 5,441,587 A | 8/1995 | Byerley | |
| 5,558,733 A | 9/1996 | Byerley | |
| 5,635,016 A | 6/1997 | Byerley | |
| 5,709,768 A | 1/1998 | Byerley | |
| 6,571,682 B2 | 6/2003 | Roberts | |
| 8,091,602 B2 * | 1/2012 | Roberts et al. | 156/406.2 |
| 2010/0000658 A1 * | 1/2010 | Roberts et al. | 156/110.1 |

FOREIGN PATENT DOCUMENTS

| | | | |
|---|---|---|---|
| CA | 2188639 | | 4/1997 |
| CA | 2219387 | | 4/1998 |
| EP | 1688240 | A1 * | 8/2006 |
| MX | 200554 | | 1/2001 |

* cited by examiner

*Primary Examiner* — Geoffrey L Knable
(74) *Attorney, Agent, or Firm* — Pitts & Lake, P.C.

(57) ABSTRACT

A transfer ring suitable for use in the manufacture of vehicle tires including a skeletal cylindrical cage which houses an oscillatable circular drive member. The drive member includes a plurality of cam followers disposed about the outer perimeter thereof and which operatively engage respective camming grooves defined in each of a plurality of hinged driven links which are individually hingedly mounted internally of the cage about the outer perimeter of the cage. Each driven link includes an inboard end hinged within the cage and an outboard end having an articulating shoe mounted thereon. The shoes are interconnected to provide like simultaneous substantially equal articulative and rotational movement of the shoes radially inwardly or radially outwardly of the cage upon rotational movement of the drive member and resultant rotational movement of the hinged driven links effected through the cam followers and camming grooves of the driven links.

10 Claims, 15 Drawing Sheets

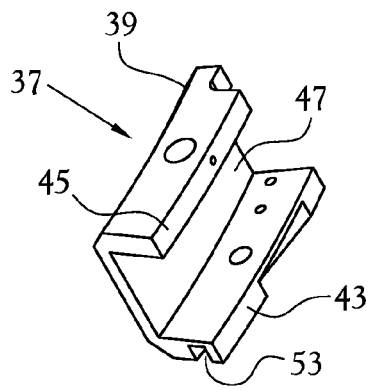
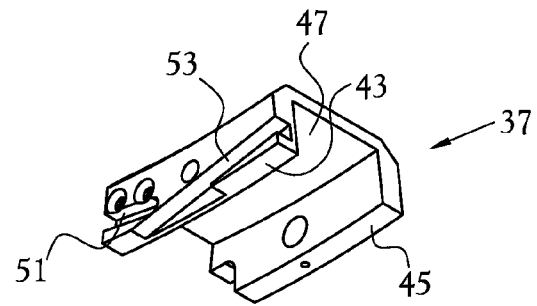
Fig.11  Fig.12
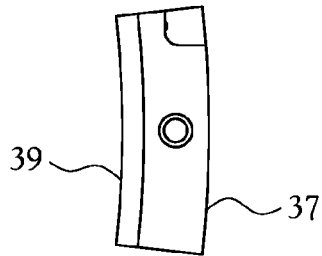
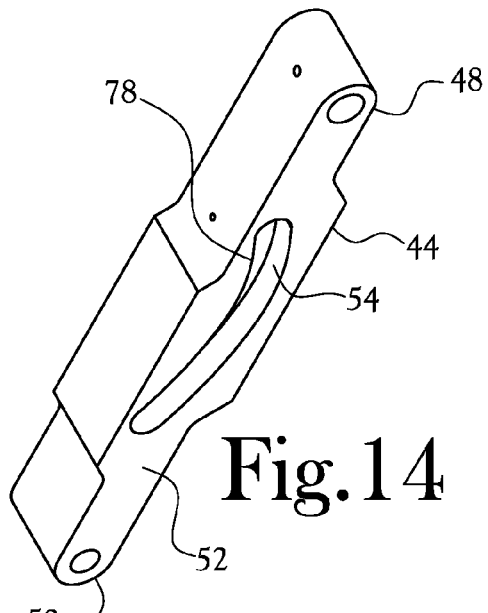
Fig.13  Fig.14
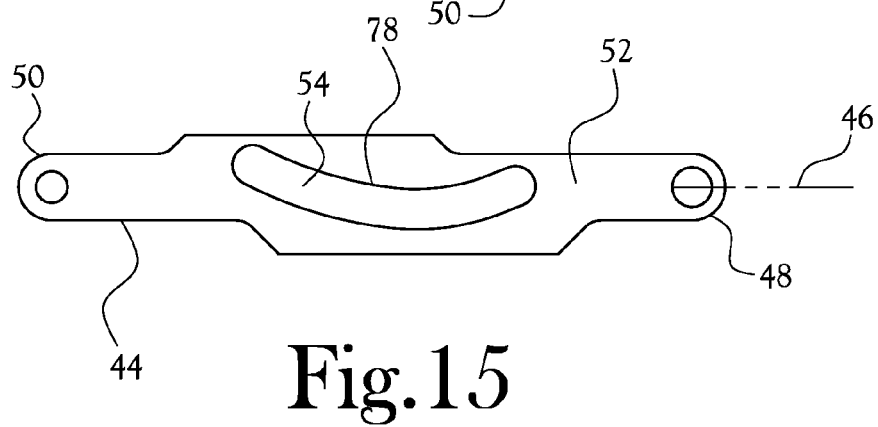
Fig.15

TRANSFER RING HAVING ADVANTAGED CAM FOLLOWER-CAMMING GROOVE ASPECT AND METHOD

CROSS-REFERENCE TO RELATED APPLICATIONS

This application is a continuation-in-part of prior U.S. patent application Ser. No. 12/166,564, filed on Jul. 2, 2008.

STATEMENT REGARDING FEDERALLY-SPONSORED RESEARCH OR DEVELOPMENT

Not Applicable

BACKGROUND OF THE INVENTION

1. Field of Invention

This invention relates to devices that are particularly useful in the manufacture of vehicle tries and relates, more particularly, to apparatus defining an inner circumference suitable to serve as a circular surface to grasp the outer circumference of a circular, tubular or round object, usually for purposes of transferring of the grasped object between first and second locations. More specifically, this invention relates to an improved transfer ring, useful in the manufacture of vehicle tires.

2. Description of the Related Art

The manufacture of a vehicle tire commonly includes the steps of forming a tire, carcass, forming a toroidal belt and tread portion of the tire separately of the carcass, and thereafter marrying the belt and tread portion of the tire to the carcass to form a "green" tire. The green tire is thereafter treated to form the tread and various other features of the tire. Other supplementary steps, such as stitching may be performed during the course of or following one or more of the aforementioned steps.

As seen in FIG. 1, formation of a belt and tread portion (often referred to as a belt and tread "package") of the tire is typically accomplished on a belt and tread drum 12. Such drum typically has an outer cylindrical surface, or circumference, about which one or more layers of tire belt material (comprising for example, reinforcement cords embedded in a polperic binder) are laid to define the belt and tread package. The circumference of such drum 12 is preferably capable of expanding and contracting to, for example, accommodate the removal from the drum of a completed belt and tread package which is essentially nonexpandable radially but which is flexible to the extent that when unsupported, the toroidal belt and tread package will sag under the influence of gravity. Also, desirably, the adjustable circumference of the belt and tread drum 12 enables a single drum to be used to form belt and tread packages of alternative diameters.

In the manufacture of vehicle tires, the drum upon which a tire carcass is formed is somewhat similar to the drum 12 upon which the belt and tread package is formed. Subsequent to the formation of the carcass, such carcass commonly is transferred to a tire expansion drum 14, and while the carcass remains on the expansion drum, it is overlaid with the toroidal belt and tread package.

In some instances, after the tire carcass has been formed, it may be transferred to a second stage drum, employing a transfer ring 16, and held thereon while a belt and tread package is transferred from the belt and tread drum onto the outer circumference of the tire carcass, also employing a transfer ring 16. Thereafter, the belt and tread package is married to the tire carcass.

The forces exerted by an expanding tire carcass during the process of marrying a belt and tread package to an expanded tire carcass may be very large. In the prior art, such large forces commonly have been accommodated by providing a relatively large power source for retaining the shoes of a prior art transfer ring in a radially inward position during the marrying of a belt and tread package to a tire carcass. Such larger power sources are relatively costly and tend to decrease the life time of the transfer ring due to exceptional friction and other forces experienced by the several elements of the transfer ring both during positioning of the shoes of the transfer ring and during the time when the elements of the transfer ring are being stressed by the expanding forces generated by the carcass. One consequence of the use of such larger power sources is the need for using costly stronger and/or larger sizes of materials in the construction of the transfer ring.

Typically, a transfer ring as employed in the vehicle tire manufacturing industry includes a plurality of arcuate segments (often referred to as "shoes") which are disposed in a circular configuration and adjustable along radial directions of the circular configuration to collectively define an inwardly facing, expandable and collapsible circular working surface for grasping one of a tire carcass or belt and tread package and transferring the same for further manufacture of a tire as discussed above. Desirably, a tire transfer ring incorporates a maximum range of adjustability of diameter of the transfer ring such that the transfer ring can be used in the manufacture of a relatively large range of vehicle tire diameters. In order for the individual shoes of a transfer ring to move radially outward, the mechanism for mounting each of the shoes includes a hinge connection of the shoe to the mechanism which moves the shoe generally radial, inwardly and outwardly. This hinged connection permits the shoe to rotate freely about the hinge connection. In applicant's U.S. Pat. No. 5,635,016, rotation of the sections of multi-sectional arcuate segment (i.e. shoe) is controlled by guide plates attached to the sections of adjacent shoes and which interact with pin means on the sections of adjacent shoes to aid in maintaining the collective circular attitude of the sections of the several shoes as the diameter of the circle collectively defined by the shoes is increased or decreased in diameter. The fabrication, installation and maintenance of this type of interconnection of the adjacent shoes of the transfer ring or drum, however, are time consuming and expensive.

Further, applicant's U.S. Pat. No. 5,709,768, there is disclosed a transfer ring wherein the plurality of shoes are mounted on the outboard ends of respective arms, whose respective inboard ends are rotatably mounted on a fixedly mounted ring. The inboard end of each arm further includes a rigid bracket element which in turn, is included in a "train" of such bracket elements. The geometry and mounting aspects of these bracket elements are chosen such that upon the application of a linear force to the train of bracket elements, the arms are caused to rotate about their inboard mountings with resultant accurate movement of the outboard ends of the arms (and the shoe attached thereto) inwardly and outwardly of the longitudinal centerline of the transfer ring. Among other things, this device is limited as to the directionality of the path of the inward and outward movement of the shoes on the arms, and lacks capability for minimization of the force transferred from the shoes to the power source associated with the device.

BRIEF SUMMARY OF THE INVENTION

In accordance with one aspect of the present invention, there is provided a transfer ring especially suitable for use in the manufacture of vehicle tires. This transfer ring includes a skeletal cylindrical cage which houses an oscillatable circular drive member therewithin. The drive member includes a plurality of cam followers disposed about the outer perimeter thereof and which operatively engage respective camming grooves defined in each of a plurality of hinged driven links which are individually hingedly mounted internally of the cage about the outer perimeter of the cage. Each driven link includes an inboard end hinged within the cage and an outboard end having an articulating shoe mounted thereon. The shoes on the several driven links are interconnected to provide like simultaneous substantially equal articulative and rotational movement of the shoes radially inwardly or radially outwardly of the cage upon rotational movement of the drive member and resultant rotational movement of the hinged driven links effected through the cam followers and camming grooves of the driven links.

BRIEF DESCRIPTION OF THE SEVERAL VIEWS OF THE DRAWINGS

The above-mentioned features of the invention will become more clearly understood from the following detailed description of the invention read together with the drawings in which:

FIG. 11 is a perspective representation of a shoe element of one embodiment of the transfer ring of the present invention;

FIG. 12 is a reversed perspective representation of the shoe element depicted in FIG. 11;

FIG. 13 is an side elevation view of the shoe element depicted in FIG. 11;

FIG. 14 is a perspective representation of one embodiment of a driven link element employed in a transfer ring of the present invention;

FIG. 15 is a side elevation view of the driven link depicted in FIG. 14;

DETAILED DESCRIPTION OF THE INVENTION

Figure 1:
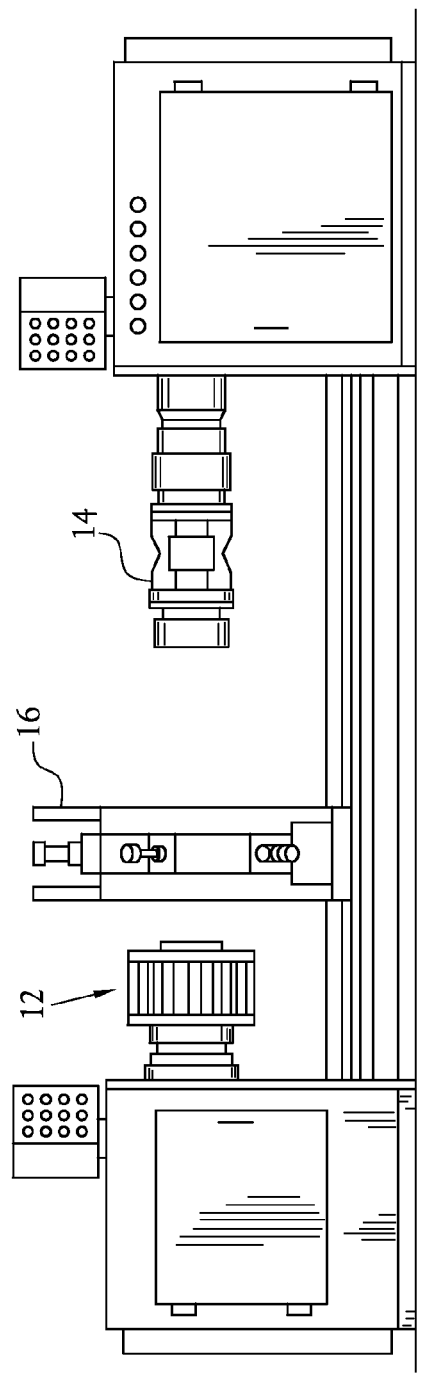
FIG. 1 is a schematic representation of a typical prior art vehicle tire forming system.

As depicted in the several Figures, and initially referring to FIGS. 2-6, in one embodiment, the present transfer ring 10 comprises first and second circular frame members 18 and 20, respectively, disposed in fixed, registered, side by side, parallel, and spaced apart relationship to one another. These circular frame members 18, 20 are of substantially the same inner and outer diameters and each preferably is of a generally rectangular cross-section (See FIGS. 2 and 8) having respective inner and outer opposite flat side surfaces 22, 26 and 24, 28, respectively.

A plurality of hinge pin connectors 30 extend between the first and second circular frame members 18, 20 at spaced apart locations about the respective perimeter margins of the first and second circular frame members 18, 20. Each hinge pin connector 30 includes a longitudinal centerline 32, first and second opposite ends 34, 36 and is of a length adapted to rigidly retain the side by side, parallel, registered, and spaced apart relationship of the first and second circular frame members 18, 20, thereby defining a skeletal cage 38 having an open space 40 between the first and second circular frame members 18, 20. (See FIG. 2). To this end, the first end 34 of each of the hinge pin connectors 30 is mounted in the first circular frame member 18 at respective spaced apart locations about the outer perimeter margin of the first circular frame member 18 and projects therefrom toward the second circular frame member 20. The second end 36 of each of the hinge pin connectors 30 is mounted in the second circular frame member 20 at selected spaced apart locations about the outer perimeter margin of the second frame member 20, such spaced apart locations on the first circular frame member 18 being in register with the spaced apart locations on the second circular frame member 20, thereby defining a substantially rigid circular skeletal cage 38 having a central axis 42 and the substantially open space 40 defined therebetween. Within the open space 40 between the first and second frame members 18, 20, there is disposed a circular drive member 43 in side by side, parallel relationship to the first circular frame member 18. This circular drive member 43 includes a central axis which is coincident with the central axis 42 of the cage 38.

Within the open space 40 defined between the first and second spaced apart circular frame members 18, 20, there are provided a plurality of driven links, 44. As seen in FIGS. 14 and 15, each driven link 44 is of an elongated geometry, having a longitudinal center line 46, a first end 48, and an opposite second end 50. As seen in FIGS. 2-6, the first end 48 of each driven link 44 is hingedly mounted on a respective hinge pin connector 30 which extends between the first and second frame members 18, 20. The opposite second end 50 of each driven link 44 extends in a cantilevered fashion generally inwardly of the first and second frame members 18, 20 and is adapted to rotate generally radially in and out of the open space 40 defined between the first and second frame members 18, 20 when the driven links 44 are rotated about their hinged first ends 48 with the skeletal cage 38.

Referring particularly to FIGS. 2, 3, 14, and 15, in accordance with one aspect of the present invention, each of the driven links 44 includes at least a first side surface 52 facing inwardly of the circular skeletal cage 38 and toward the circular drive member 43. This first side surface 52 of each driven link 44 is provided with an elongated curved camming groove 54 defined along a portion of the length of the first side surface 52 of each of the driven links 44. As further described hereinbelow, each camming groove 54 is adapted to operatively receive therein one of a plurality of roller cam followers 56 exposed on an inboard side surface 58 of the circular drive member 43, whereby rotational movement of the circular drive member 43 moves the cam followers 56 along at least a portion of a circular path within the skeletal cage 38. This circular path is concentric with the central axis 42 of the cage 38.

Figure 19:
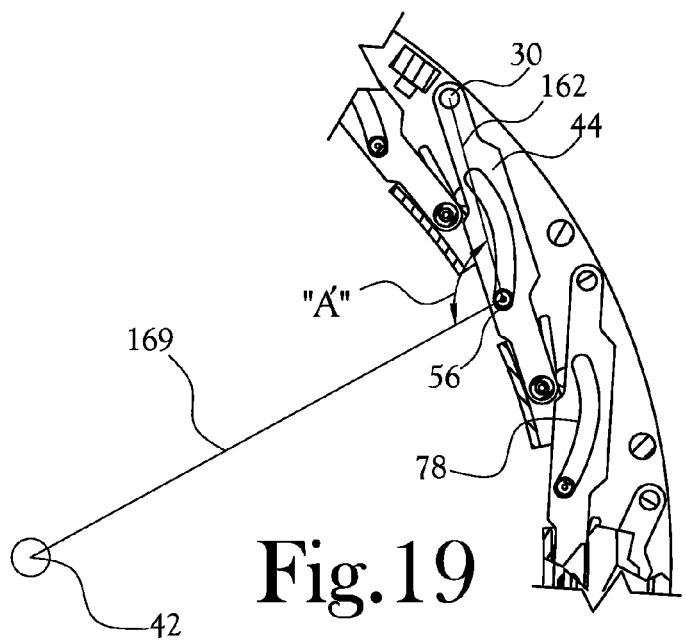
FIG. 19 is a partial cutaway side view of a portion of the transfer ring depicted in FIG. 6 taken generally along the line 19-19 of FIG. 6.

In the depicted embodiment, each curved camming groove 54 is generally arcuate in shape, with the concavity of each camming groove 54 generally facing the central axis 42 of the cage 38 when the driven links 44 are rotated to their outmost attitude retracted from the central axis 42 of the cage 38 (See FIG. 19). The length of each camming groove 54 is chosen to provide for movement of each cam follower 56 from one end of its associated groove 54 to the opposite end of the groove 54 when the circular drive member 43 is rotated. In the depicted embodiment, the length of each camming groove 53 determines the extent of permissible rotation of the circular drive member 43 and is chosen to provide for the movement of the second ends 50 of each of the driven links 44 between the retracted position (FIG. 3), with the second ends 50 of the links 44 within the cage, and a contracted position (FIG. 2), with the second ends 50 of the links 44 extended inwardly toward the central axis 42 of the cage 38.

Referring specifically to FIGS. 2, 3, 5 and 11-13 the second end 50 of each of the driven links 44 has attached thereto an articulating shoe 37. Each of the plurality of shoes 37 mounted on the second ends 50 of the driven links 44 includes an inner surface 39 facing substantially radially inwardly toward the central axis 42 of the skeletal cage 38. In the depicted embodiment of each shoe 37, this inner surface 39 is slightly concave along its length dimension so as to define a portion of a collectively established circular surface 41 adapted to surround and grasp an object, especially for transfer of such object between separated locations.

Figure 5:
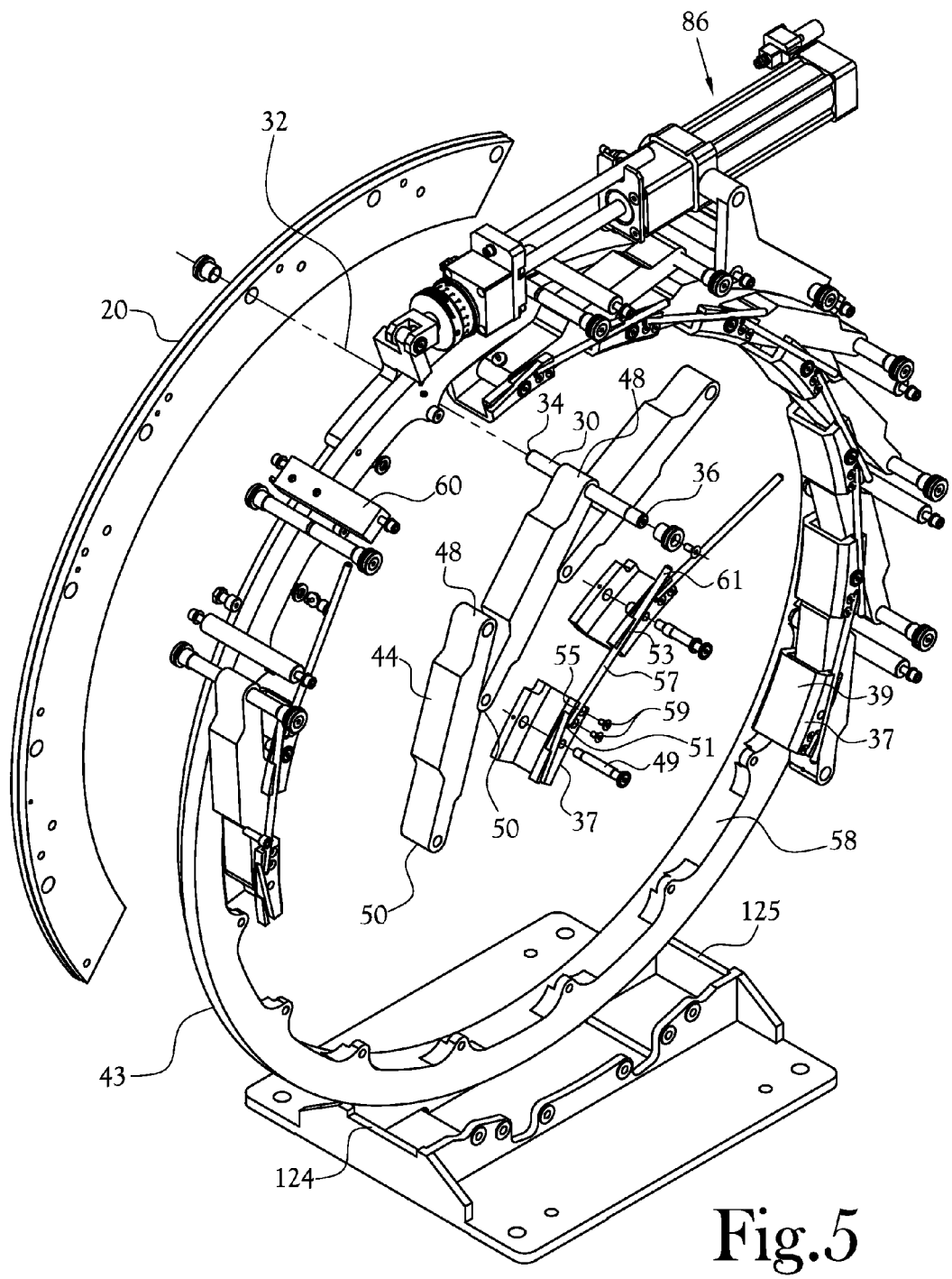
FIG. 5 is an exploded partial perspective view of one embodiment of a transfer ring of the present invention.
Figure 6:
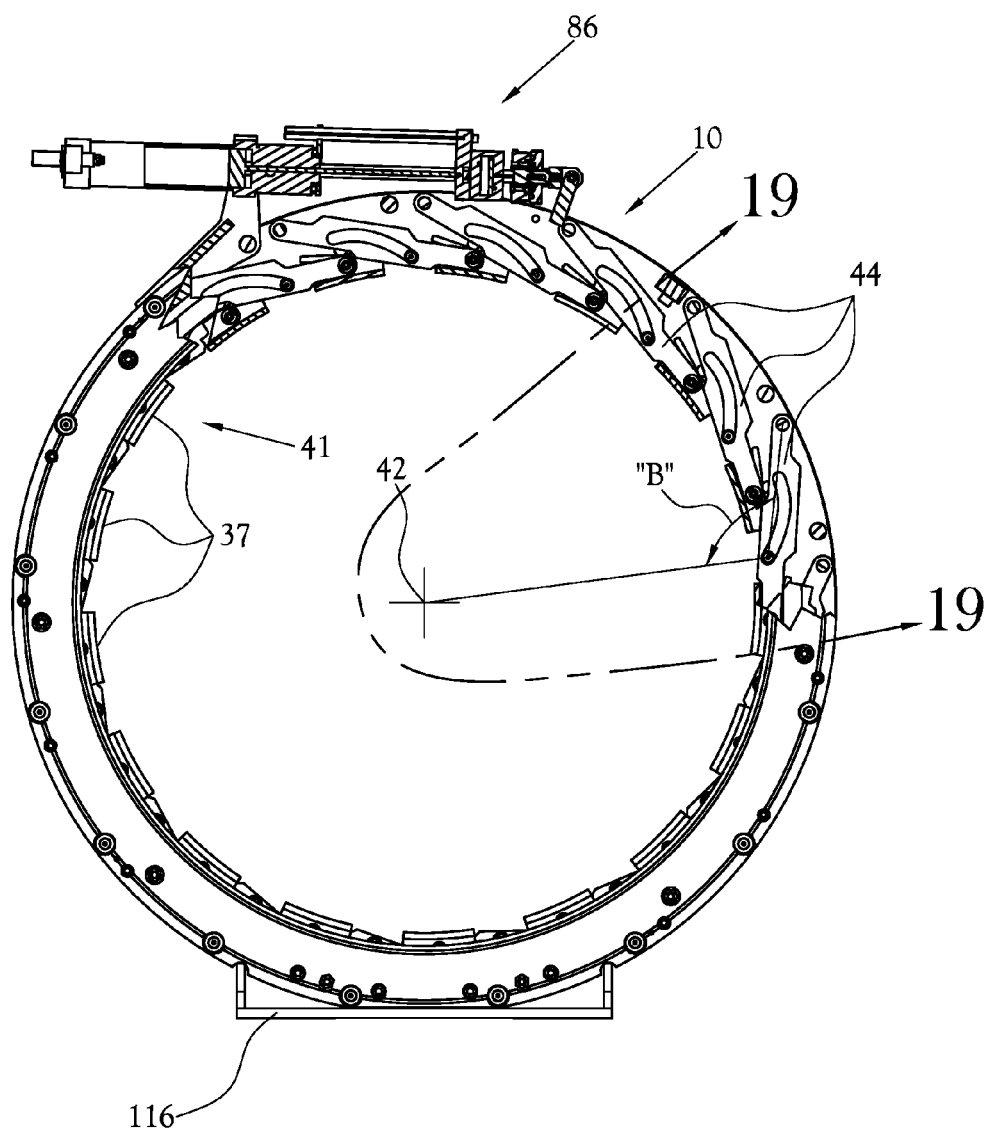
FIG. 6 is a side elevation view, partly cutaway, of one embodiment of a transfer ring depicting various aspects of the present invention.

Each shoe 37 further includes first and second side walls 43, 45, respectively, which are upstanding from an opposite outer surface 47 of the shoe. As seen in FIG. 5, the second end 50 of each driven link 44 resides between opposite side walls 43, 45 of a respective shoe 37, which is articulately mounted to the second end 50 of its respective driven link 44 as by a pivot pin 49 which extends through the side walls 43, 45 of the shoe 37 and the second end 50 of the driven link 44. As so mounted, each shoe 37 is carried substantially radially inwardly toward or outwardly from the central axis 42 of the skeletal cage 38 upon rotation of the driven links 44 about the associated pivot pin connectors 30. In certain embodiments, adjustability of the limits of articulation of each shoe 37 about its respective driven link second end 50 and accompanying pivot pin 49 may be provided, thereby giving a user the ability to change the range of grasping diameters possible for a given degree of rotation of the drive ring 43.

As seen in FIGS. 5 and 11-13, each shoe 37 defines first and second separate grooves 51, 53 defined along a first side wall 43 thereof. The first groove 51 includes a blind end and opens toward an adjacent shoe 37. The second groove 53 is open at both ends along the first side wall 43. The first groove 51 is adapted to receive therein a first end 55 of a rigid rod 57 of a length sufficient to span two adjacent ones of the shoes 37. Such first end 55 of the rod 57 is anchored within this first groove as by flat head screws 59. The opposite second end 61 of each rod 57 extends into the open-ended second groove 53 of an adjacent shoe 37, where such second end 61 of the rod 57 is slidably held within such second groove 53. By this means, the shoes 37 are interconnected in a train fashion so that articulation of the shoes 37 about the second ends 50 of the driven links 44 upon radial movement of the second ends 50 of the driven links 44 is simultaneous and of like direction and extent, thereby ensuring continued retention of the collectively-established circular orientation of the concave, inner grasping surfaces 39 of the plurality of shoes 37 over their full extent of motion radially inwardly toward and outwardly from the central axis 42 of the cage 38. Thus, within a given range of grasping diameters of the transfer ring 10 of the present invention, the inner surfaces 39 of the shoes 37 collectively define the circular grasping surface 41 having a diameter which is selectable by selection of the extent of rotation of the circular drive member 43.

Figure 2:
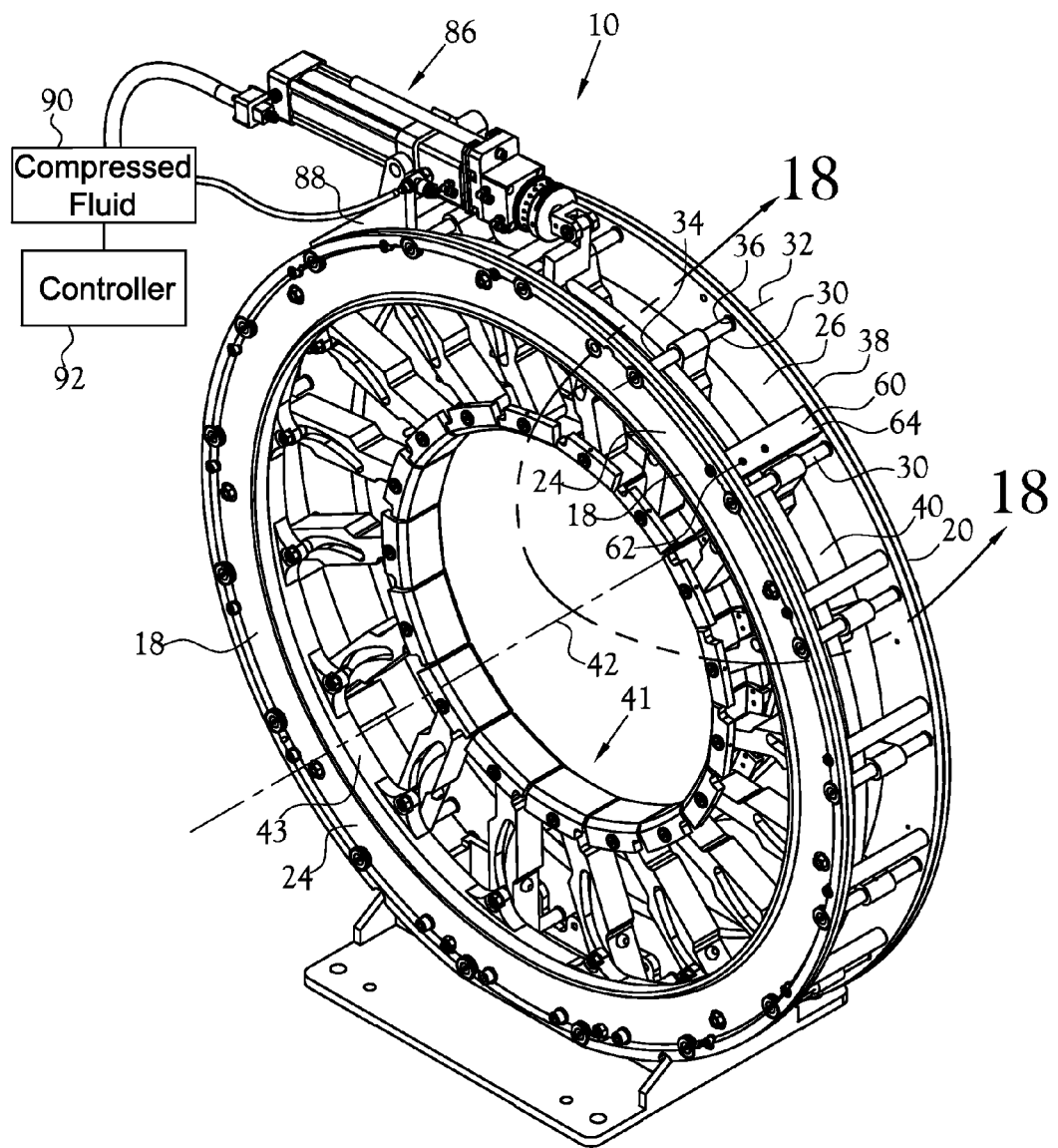
FIG. 2 is perspective view of one embodiment of a transfer ring in its contracted diameter attitude and depicting various aspects of the present invention.
Figure 8:
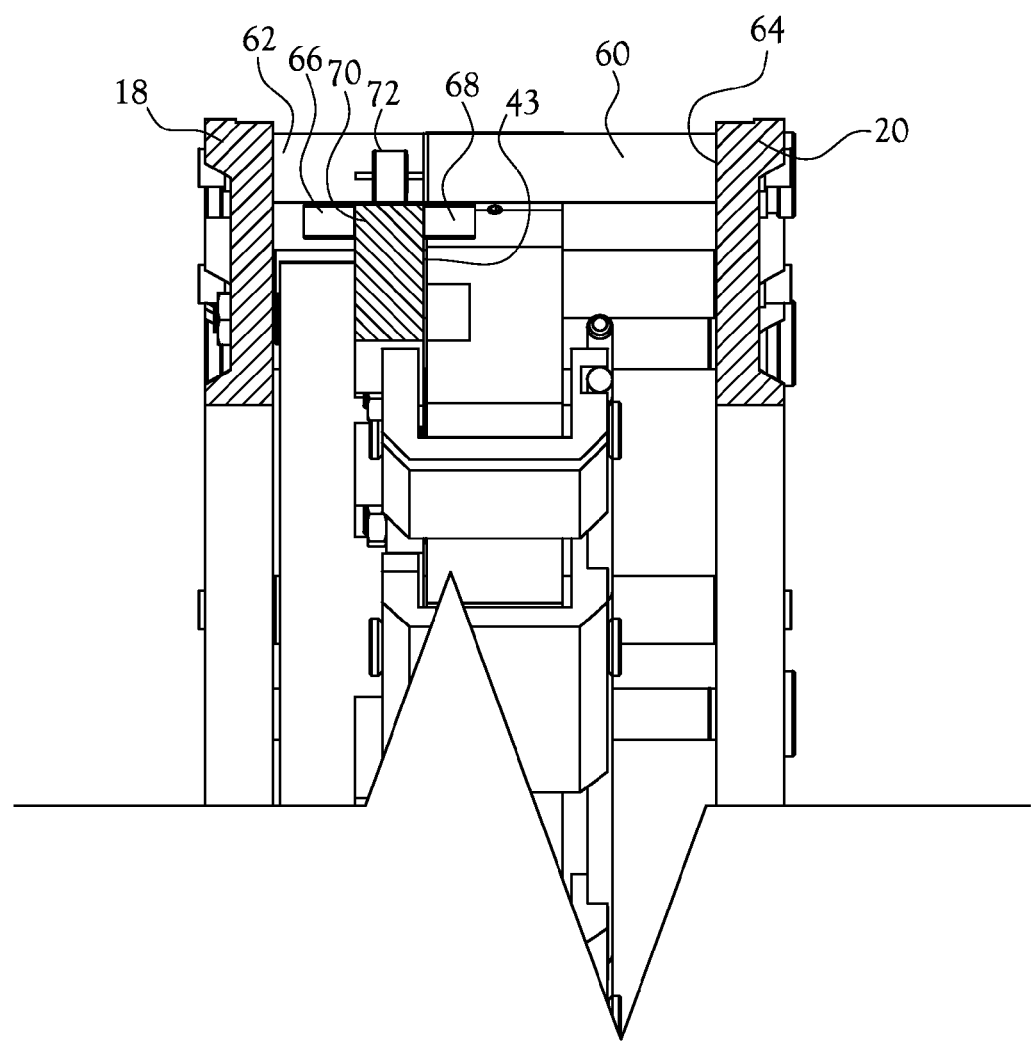
FIG. 8 is a partial sectional end view taken generally along the line 8-8 of FIG. 3.
Figure 9:
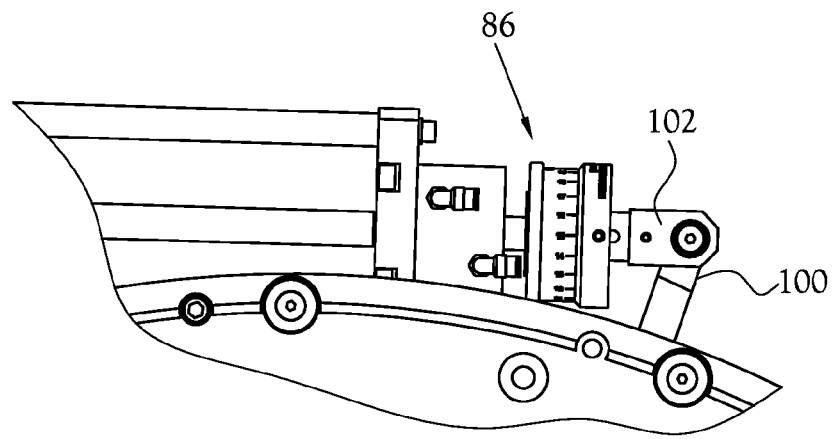
FIG. 9 is a side elevation cutaway view taken generally along line 9-9 of FIG. 3.
Figure 10:
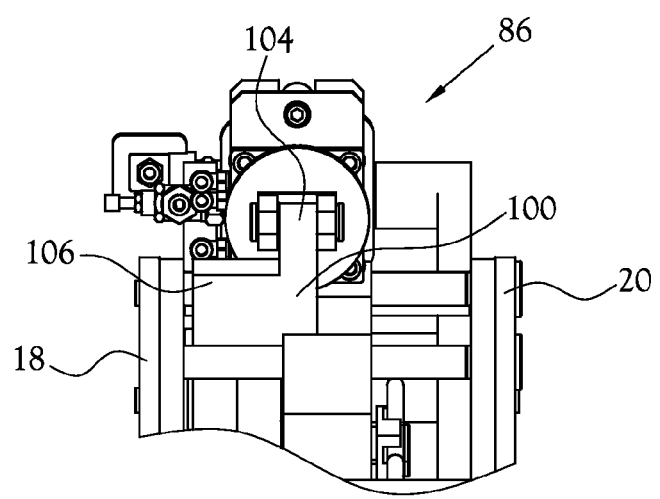
FIG. 10 is a front elevation cutaway view taken generally along the line 10-10 of FIG. 3.

As seen in FIGS. 2,-5, and 8, in certain embodiments, further integration of the first and second circular frame members 18, 20 is ensured by means of plurality of cross plates 60 which are connectively interposed between the first and second circular frame members 18, 20 at spaced apart locations about the outer circumference of the cage 38. Each cross plate 60 includes first and second opposite ends 62, 64, the first end 62 of which is anchored to the outer perimeteral margin of the first circular frame member 18 and the second end 64 of which is anchored to the outer perimeteral margin of the second circular frame member 20.

Figure 7:
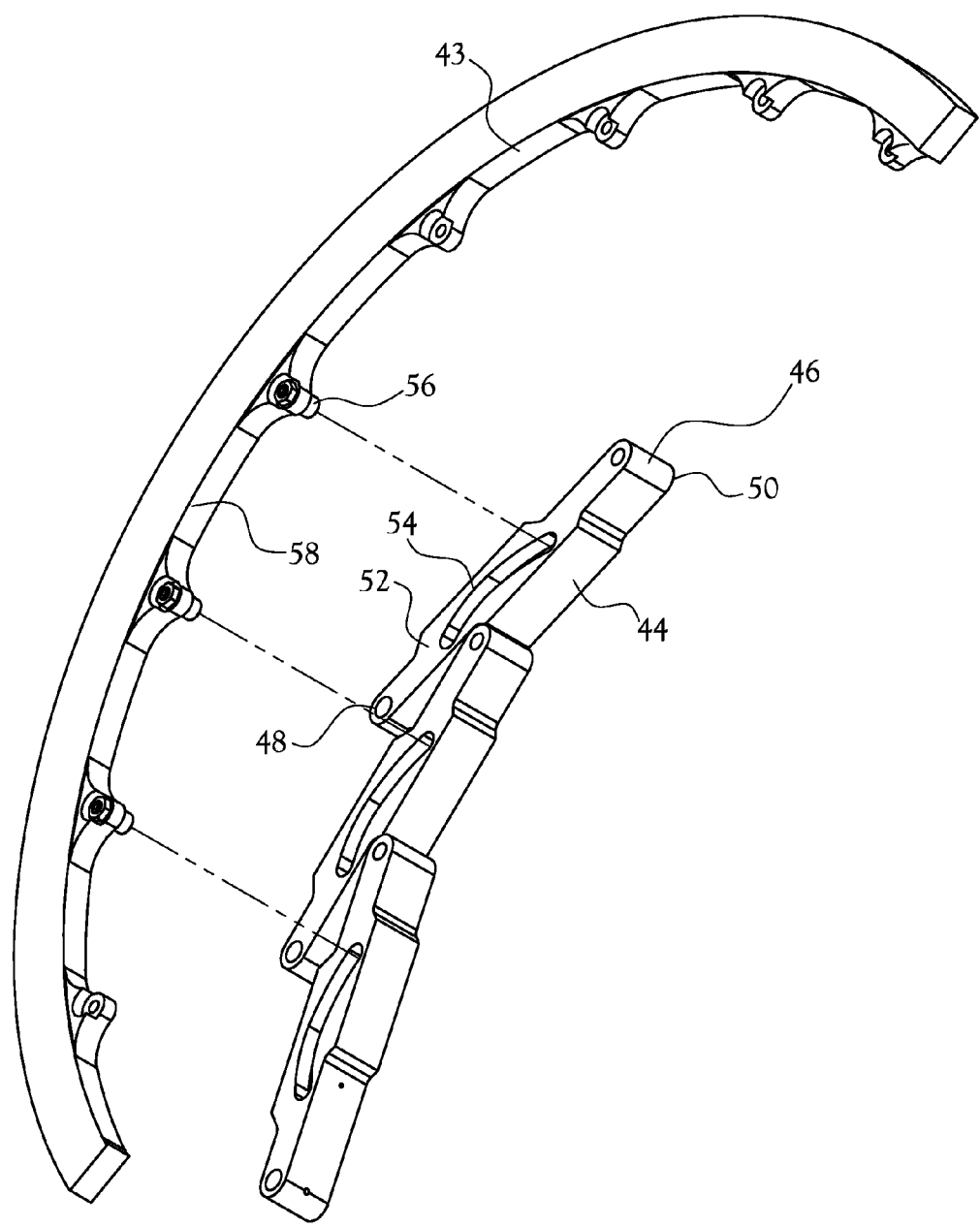
FIG. 7 is an exploded perspective view showing a portion of one embodiment of a transfer ring and depicting the cam-cam follower aspect of the present invention.

As depicted in FIG. 8, generally intermediate the opposite ends of each cross plate 60, there are mounted first and second spaced apart roller guides 66, 68 which lie in a plane parallel to the plane of the cross plate 60 and which project inwardly from the cross plate 60 to define a passageway 70 therebetween. Further as seen in FIGS. 7 and 8, the circular drive member 43 is of a generally rectangular shaped cross section having smooth opposite side surfaces. As mounted within the circular cage 38, the circular drive member 43 is disposed between, and rotatably retained by, the passageway 70 defined between the first and second roller guides 66, 68 that are mounted on the inner surface of each cross plate 60. As seen in FIG. 8, there is mounted on each cross number 60, a further roller 72 adapted to engage an outer circumferential surface of the circular drive member 43. The several rollers 66, 68, 72 mounted on the several cross plates 60 function to retain the circular drive member 43 concentric with the first and second frame members 18, 20 while the first and second rollers 66, 68 function to maintain the circular drive member 43 in parallel relationship to the first and second frame members 18, 20. In this manner, the mounting of the circular drive member 43 within the interior of the cage 38 provides for sliding, guided directional rotation clockwise or counterclockwise, of the circular drive member 43 about the central axis 42 of the cage 38 while being retained in its adjacent relationship to the non-rotatably mounted first and second frame members 18, 20 of the cage 38.

Referring to FIGS. 2, 5, 7, and 8, on the inner circumferential surface 58 of the circular drive member 43 there is provided a plurality of roller cam followers 56 which project laterally away from a side surface of the circular drive member 43 toward the plurality of driven links 44 which are pivotally mounted within the open annular space 40 defined between the first and second frame members 18, 20 of the cage 38. In the depicted embodiment, there is provided one cam follower 56 for engagement with each one of the driven links 44. It will thus be recognized that rotation of the circular drive member 43 about its rotational axis will cause all of the cam followers 56 to move along a circular path simultaneously with the drive member 43. Since each cam follower 56 engages a camming groove 54 of a respective one of the driven links 44, rotation of the cam followers 56 effects movement of the driven links 44 about their hinged mounting to respective ones of the hinge pin connectors 39.

A power source 86 for effecting controlled rotation of the circular drive member 43, in the depicted embodiment, includes a double-acting piston/cylinder device 86 which is mounted on the outer periphery of the first and second frame members 18, 20 as by one or more brackets 88. The piston/cylinder device 86 may be powered by compressed fluid from a reservoir 90, the start, stop, duration and direction of flow of which is controlled by a conventional controller 92. Whereas the depicted power source 86 is of the piston/cylinder type, it will be recognized that other types of power sources may be employed without departing from the spirit and scope of the present invention.

Figure 16:
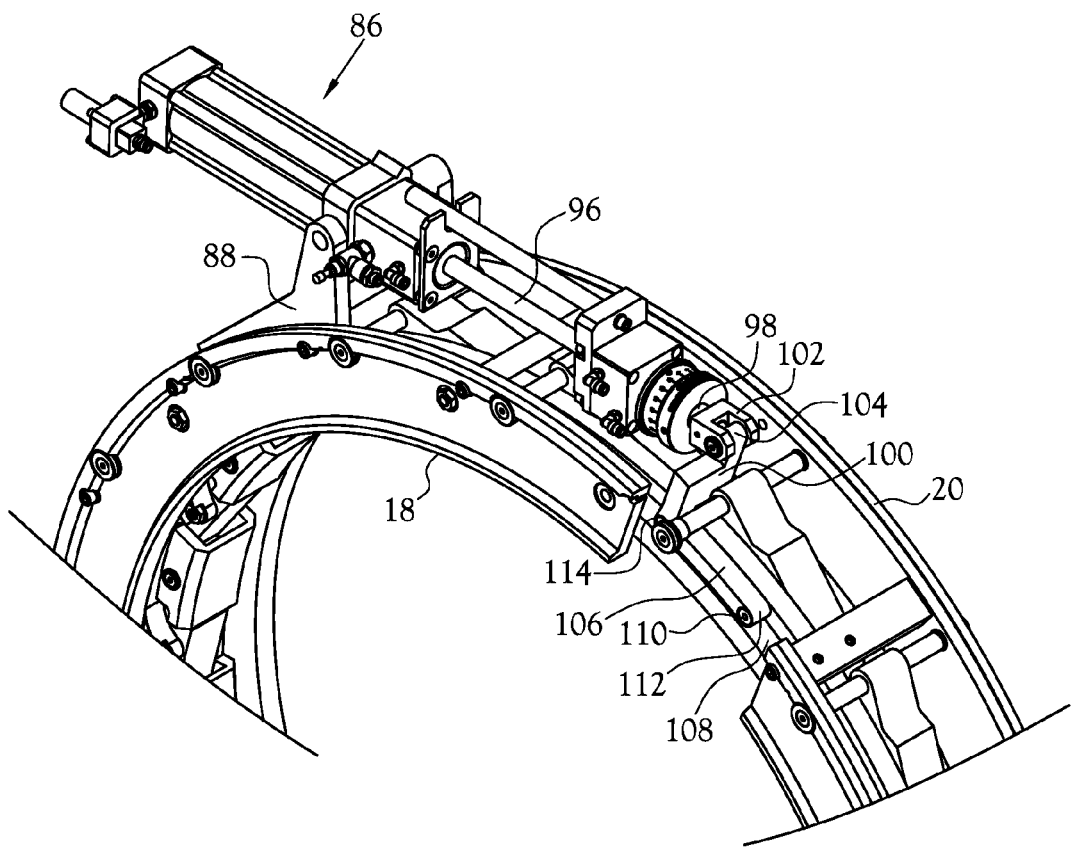
FIG. 16 is a partial cutaway view depicting a piston/cylinder power source mounted on a transfer ring and its connection to the circular drive member in one embodiment of the present invention.
Figure 17:
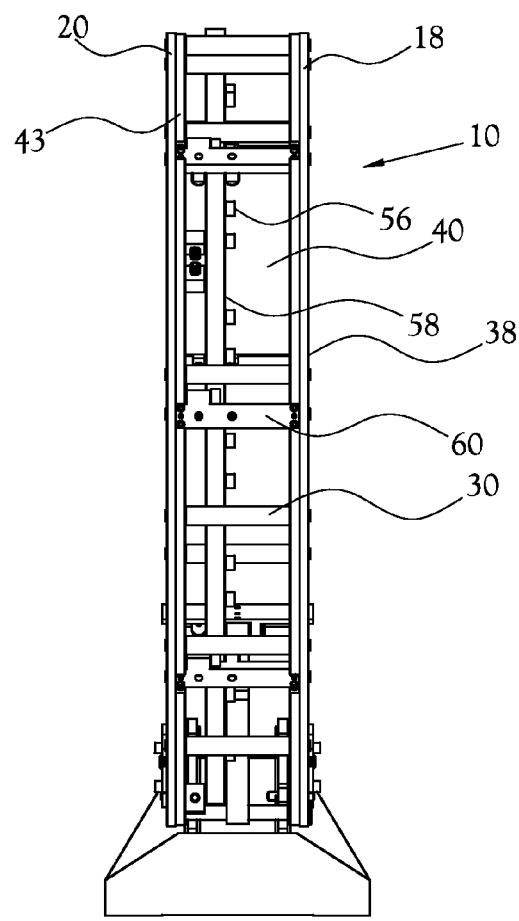
FIG. 17 is an end view of the transfer ring depicted in FIG. 2 with various elements omitted for clarity of depicting the spatial relationship of the cage-defining frame members of the depicted embodiment of the present invention.

As seen in FIGS. 2, 3, 5, 9, 10, and 16, the piston/cylinder device 86 defines an outboard end 98 having a piston rod 96 which is attached to the first upstanding leg 104 of an L-shaped connector-driven link 100 as by a clevis 102. As seen in FIG. 16, the second leg 106 of the connector driven link lies within a groove 108 defined in the outer peripheral surface of the circular drive member 43. The connector-driven link 100 is attached to the circular drive member 43 as by common screws 110 located adjacent the outboard end 112 of the second leg 106 of the connector-driven link 100 and adjacent the bend at the juncture 114 of the first and second legs 104, 106 of the connector-driven link 100, thereby locking the connector-driven link 100 to the circular drive member 43, hence to the power source 86. Accordingly, the connector-driven link 100 is positioned to rotate the circular drive member 43 clockwise or counterclockwise about its rotational axis upon extension or retraction of the piston rod 96 within the piston/cylinder device 86.

In accordance with one aspect of the present invention, the degree of rotation of the circular drive member 43 need only be limited. More specifically, rotation of the drive member through only a few degrees of rotation acts through the cam follower 56 and camming groove 54 and the length of the hinged driven links 44 to produce resultant radial movement of each shoe 37 of the device by a distance sufficient to move the shoes 37 from their maximum retraction into the cage 38, to their maximum contraction toward the central axis 42 of the cage 38 (see FIGS. 2 and 3), where such shoes 37 are in position to engage and grasp a cylindrical, round or similarly configured object. Due in major part to the mechanical structure of the various components of the present transfer ring 10, such as the use of the circular driven member 43, cam follower/camming groove combination 56, 54, the present transfer ring 10 is capable of using a relatively small power source 86 for applying a substantially greater gripping force against a grasped object than heretofore has been obtainable with known prior art transfer rings employing even larger piston/cylinder power devices. Moreover, by reason of the limited motion of each element of the present transfer ring 10, and the minimized force experienced by the components of the present invention, there is reduced wear and tear upon the ring 10 during use, thereby enlarging its anticipated life time. In one embodiment of the present transfer ring, those structural elements which are potentially subjected to frictional force, hence wear upon the element, are provided with a lubricative polymeric coating, such as Teflon™, to further extend the anticipated life time of the overall transfer ring.

Figure 3:
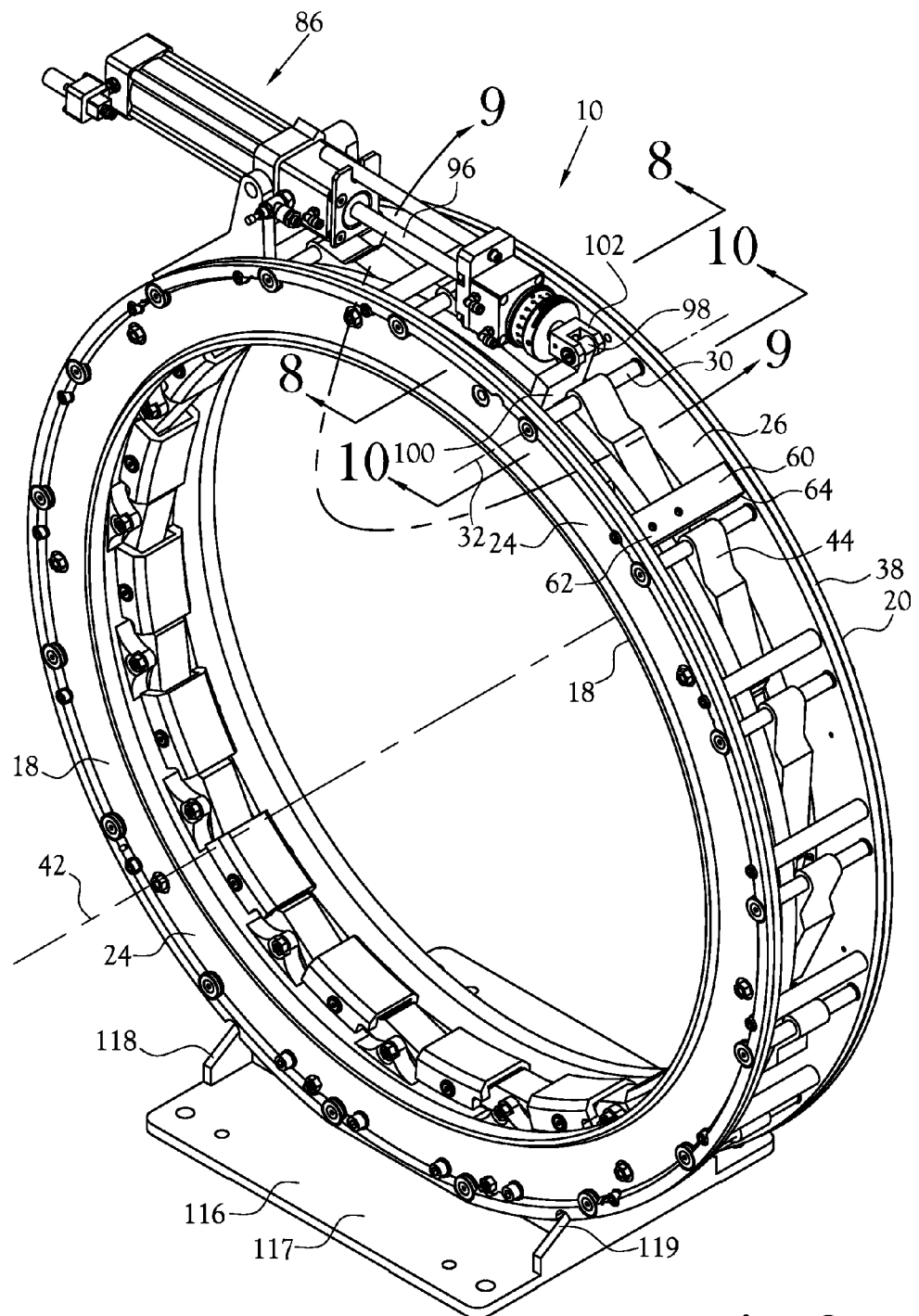
FIG. 3 is a perspective view of the transfer ring of FIG. 2 in its retracted diameter attitude.
Figure 4:
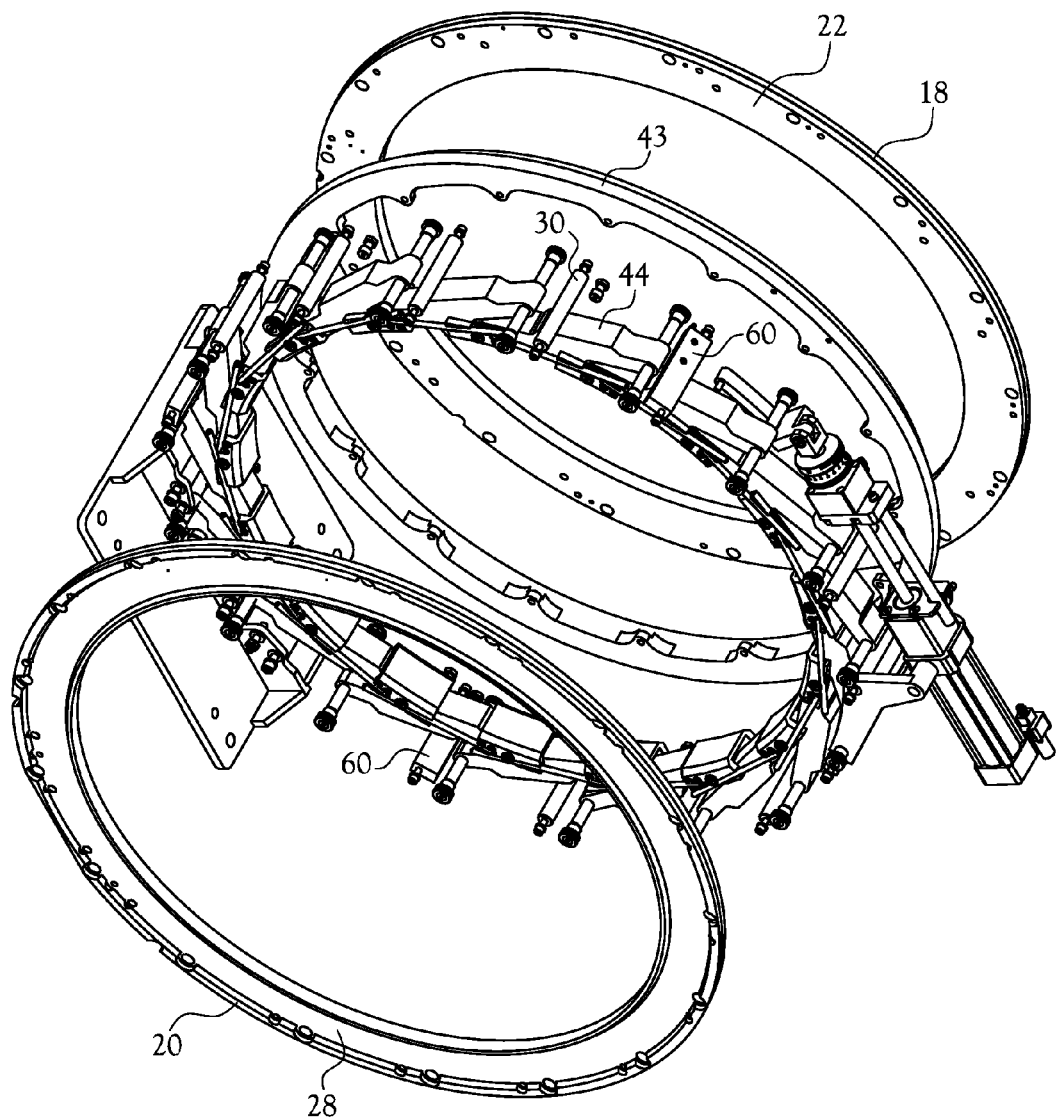
FIG. 4 is a partially exploded perspective view of one embodiment of a transfer ring of the present invention.

With reference to FIG. 3, a mount 116 for the cage 38 is provided. The depicted mount 116 includes a base plate 117 having first and second upstanding side walls 118, 119 which are adapted to support the cage 38 while providing for at least limited rotational movement of the circular drive member 43 within the cylindrical skeletal cage 38 and relative to the first and second circular frame members 18, 20 and about the common central axis 42 of the cage 38 and the circular frame members 18, 20. As depicted in FIGS. 3 and 5, in one embodiment of a mount 116 for the cage 38, respective outboard edge portions, 124, 125 of the side walls 118, 119 are cutaway to provide clearance for the circular drive member 43 to rotate relative to the side walls 118, 119 of the mount 116.

In one embodiment, the method of the present invention for the transfer of an object having at least a girth portion thereof which requires substantially continuous support for the object in the course of such transfer, comprises the steps of interconnecting one end of each of a plurality of elongated hinged links within an open space defined internally of a circular skeletal cage proximate the outer periphery of the cage, an opposite outboard end of each of a plurality of elongated hinged links being free floating and having mounted thereon an articulating shoe having an outer surface suitable for forming a portion of a collectively defined substantially circular grasping geometry, defining a preferably curved camming groove in a side surface of the each of the plurality of elongated hinged links, mounting within the open space of the cylindrical skeletal cage, a circular drive member, having a rotational axis coincident with the central axis of the skeletal cage, operatively interconnecting the circular drive member with the plurality of elongated hinged links by means of a plurality of cam followers interposed between the circular drive member, and the camming grooves, encircling the object proximate the girth thereof with the shoes mounted on the links, adjusting the rotational position of the circular drive member whereby the plurality of links are rotated about their hinged ends, thereby moving the shoes radially inwardly or outwardly of the cage as a function of the direction and extent of rotation of the circular drive member acting through the cam-followers, camming grooves and the elongated links with resultant grasping or releasing of the object encircled by the shoes.

Figure 18:
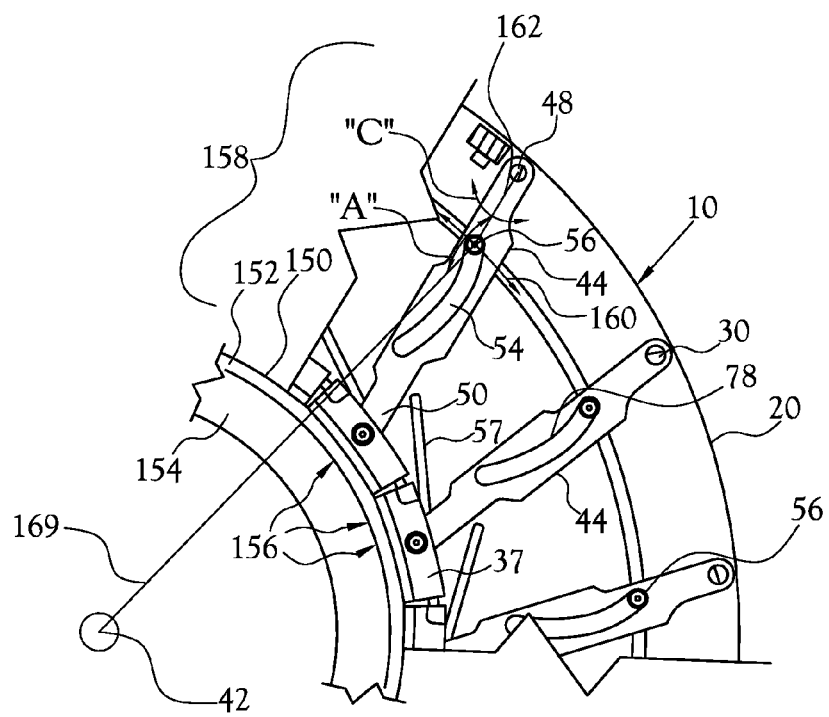
FIG. 18 is a partial cutaway side view of a portion of the transfer ring depicted in FIG. 2, taken generally along the line 18-18 of FIG. 2.

As depicted in FIG. 18, in one example the transfer ring 10 of the present invention may be employed to grasp the outer circumference 150 of a belt and tread package 152 of a vehicle tire and transfer such package 152 in encircling relationship to a green tire carcass 154 which is disposed on a shaping expansion drum 14 (See FIG. 1). Once the belt and tread package 152 is disposed in its desired encircling relationship to the tire carcass 154, inflation of the tire carcass is employed to marry the belt and tread package 152 to the tire carcass 154, as is known in the art.

It will be recognized that in the foregoing example, inflation of the tire carcass 154 expands the carcass radially outwardly, creating a substantially large radial force (arrows 156 in FIG. 18) against the plurality of shoes 37 which are collectively forming the grasping surface 41 of the transfer ring 10. For the marrying of the belt and tread package 152 to the carcass 154 to be successful, it is important that the belt and tread package 152 be restrained against radial movement of such package relative to the underlying carcass 154 for a time sufficient for the completion of the marrying of the belt and tread package 152 to the carcass 154. Such marrying may take various forms, but in all instances, the concentricity of the belt and tread package 152 relative to the underlying carcass 154 must both be maintained uniform about the circumference of the carcass 154 and the forces 156 applied by the expanding carcass 154 against the belt and tread package 152, hence against the plurality of shoes 37 of the transfer ring 10, must be uniformly resisted by the transfer ring 10, all without alteration of the selected inner diameter 41 of the transfer ring 10.

With specific reference to FIGS. 18 and 19, it will been seen that in the present invention, the geometrical relationship between each driven link 44 and its respective shoe 37, the hinge pin connector 30 of the first end 48 of the driven link 44, the cam follower 56 associated with the limitedly-rotatable cylindrical drive member 43 mounted internally of the skeletal cage 38 and the camming groove 54 associated with the driven link 44 cooperatively function to effect radial movement of the shoe 37 of each driven link 44, hence the development of a collectively defined inner diameter grasping surface 41 of the transfer ring 10. In the present invention, during those time intervals where the transfer ring 10 is grasping, supporting and relocating a belt and tread package 152 onto a carcass 154, the movement of the shoes 37 of the transfer ring 10 are moved with relatively small forces between their respective radially inward positions of defining a contracted grasping inner diameter surface (FIG. 18) and their respective radially outward positions where the shoes are retracted (FIG. 19) from the engagement with an object. To this end, as depicted in FIGS. 18 and 19, the movement of each shoe 37 is substantially effected by its own linkage module 158, the linkage modules of the several shoes 37 being interconnected for simultaneous uniform movement, both with respect to speed, direction and extent of their movement.

FIG. 18 depicts a typical linkage module 158 for a shoe. In the depicted embodiment, each module 158 includes a driven link 44 which has its first end 48 hingedly mounted about a connector pivot pin 30 which enjoys a fixed location between the first and second frame members 18, 20 of the transfer ring 10 and proximate the outer peripheries of these frame members 18, 20. For clarity, only the second frame member 20 is shown in FIG. 18. As so mounted, the second end 50 of the driven link 44 is cantilevered when the driven link 44 is rotated about its pivot pin 30.

Further, as discussed above, each driven link 44 includes a contoured (i.e. curved) camming groove 54 extending along its length. This camming groove 54 receives therein a respective cam follower 56 which projects into the camming groove from the inside surface of the cylindrical drive member 43 which is rotatably mounted within the skeletal cage 38. In one embodiment, seventeen such modules are provided about the circumference of the skeletal cage 38. The multiple modules are interconnected as described hereinabove by means of one or more physical features of the shoes 37, rigid rod 57 and the driven links 44.

In operation, actuation of the power source 86 in a first direction functions to rotate the cylindrical drive member 43 in a first rotational direction about the central axis 42 of the cage 38. Reversal of the power source 86 functions to rotate the cylindrical drive member 43 in a second rotational direction within the cage 38. Rotation of the cylindrical drive member 43 functions to move the cam followers 56 mounted on, and projecting from, the inside surface of the cylindrical drive member 43, along a circular path 160 about the central axis 42 of the cage 38. In turn, each cam follower 56, being in physical engagement with a camming groove 54 of its respective driven link 44 slides along such groove 54 as a function of the extent of the rotational movement of the cam followers 56. Inasmuch as the cam followers 56 are moving along the circular path 160 about the central axis 42 of the cage 38, and inasmuch as each of their respective driven links 44 is hinged for rotation of the driven link 44 about the hinge pin connector 30 (see arrow "C"), the rotational movement of the circular drive member 43 and its cam followers 56 in a first rotational direction functions to move each cam follower 56 from an end of its camming groove 54 near the driven link first end 48, along the groove 54, toward the opposite end within its camming groove 54, thereby causing rotation of each driven link 44 toward a retracted position (FIG. 19). Conversely, rotational movement of the circular drive member 43 and its cam followers 56 in a second rotational direction functions to move each cam follower 56 from an end of its camming groove 54 hear the driven link second end 50, along the groove 54, toward the opposite end within its camming groove 54, thereby causing rotation of each driven link 44 toward a contracted position (FIG. 18). As depicted in FIGS. 18 and 19, such rotational movement of each driven link 44 results in radially inward and outward movement of the shoes 37 associated with the driven links 44.

As seen in FIG. 18, when the rotational position of the cam follower 56 of a given linkage module 158 is disposed at the end of the camming groove 54 of its respective driven link 44 nearest the driven link first end 48, the angle "A" defined between the force line 162 extending between the hinge connector 30 of a driven link 44 and its respective cam follower 56, and the force line 169 extending between the cam follower 56 and the central axis 42 of the cage 38 is materially greater than this same angle "A" (FIG. 19) defined when the cam follower 56 of the given linkage 158 is disposed at the end of the camming groove 54 of its respective driven link 44 nearest the driven link second end 50. Thus, when the transfer ring 10 is configured to a contracted position (FIG. 18), the resultant of this geometrical arrangement is that the force applied to each driven link 44 by the expanding tire carcass 154 is in a substantially straight line (i.e., in a radial direction generally along both force lines 162, 169) when the force applied to the driven link 44 by the expanding carcass is maximum, thereby minimizing the restrictive requirements for the power source 86. Contrariwise in the present invention, when during operations of the present invention, there no longer is need for the transfer ring 10 to be exerting a grasping force or resisting a radially outward force, movement of the cylindrical drive member 43 in the first rotational direction returns the driven links 44 to their radially outermost positions, a function which requires relatively small power from the power source 86. The present invention, therefore, may employ a power source 86 of relatively lesser cost and which exerts lesser frictional forces upon the several moving elements of the plurality of linkage modules, etc.

With reference to FIGS. 18 and 19, it will be recognized by one of skill in the art that the forces of expansion 156 of the tire carcass 154 against the grasping surface 41 of the transfer ring 10 tend to urge the shoes 37 of the transfer ring 10 toward the retracted position (FIG. 19), thereby urging rotation of the driven links 44 outwardly away from the central axis 42 of the cage 38 and pressing each cam follower 56 against an inner curved surface 78 of its associated camming groove 54. As each cam follower 56 attempts to slide along the curved inner surface 78 of its associated camming groove 54, the curved inner surface 78 acts as a slight incline or "hump" which must be overcome by the cam follower 56 in order to allow the cam follower 56 to slide toward the second end 50 of the driven link 44, thereby allowing outward rotation of the driven link 44 and retraction of the shoes 37. Thus, it will be understood that the curved shape of the camming groove 54 serves to add a measure of structural support to the positioning of the gripping surface 41 radially inwardly toward or outwardly from the central axis 42 of the cage 38.

Figure 20:
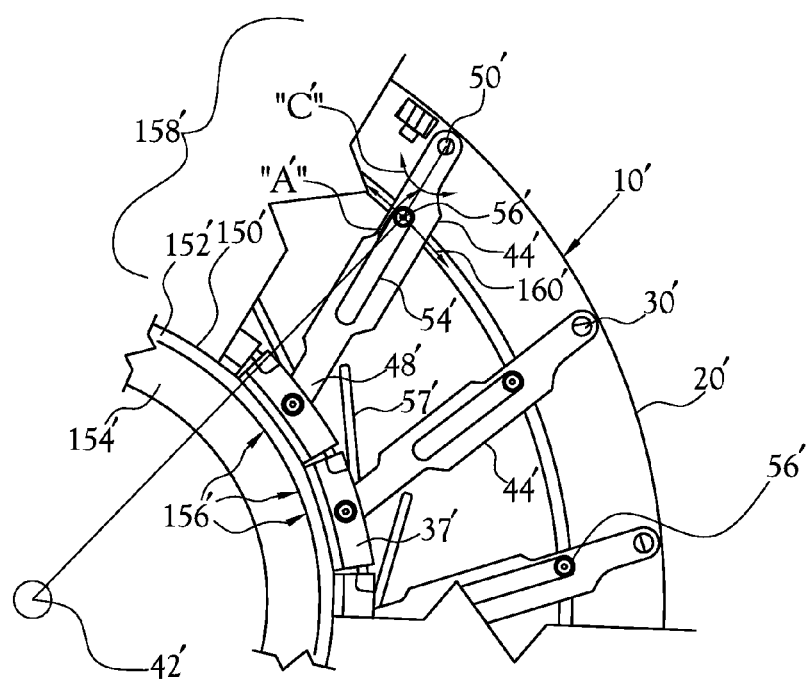
FIG. 20 is a partial cutaway side view as depicted in FIG. 19, but employing a non-curved camming groove.
Figure 21:
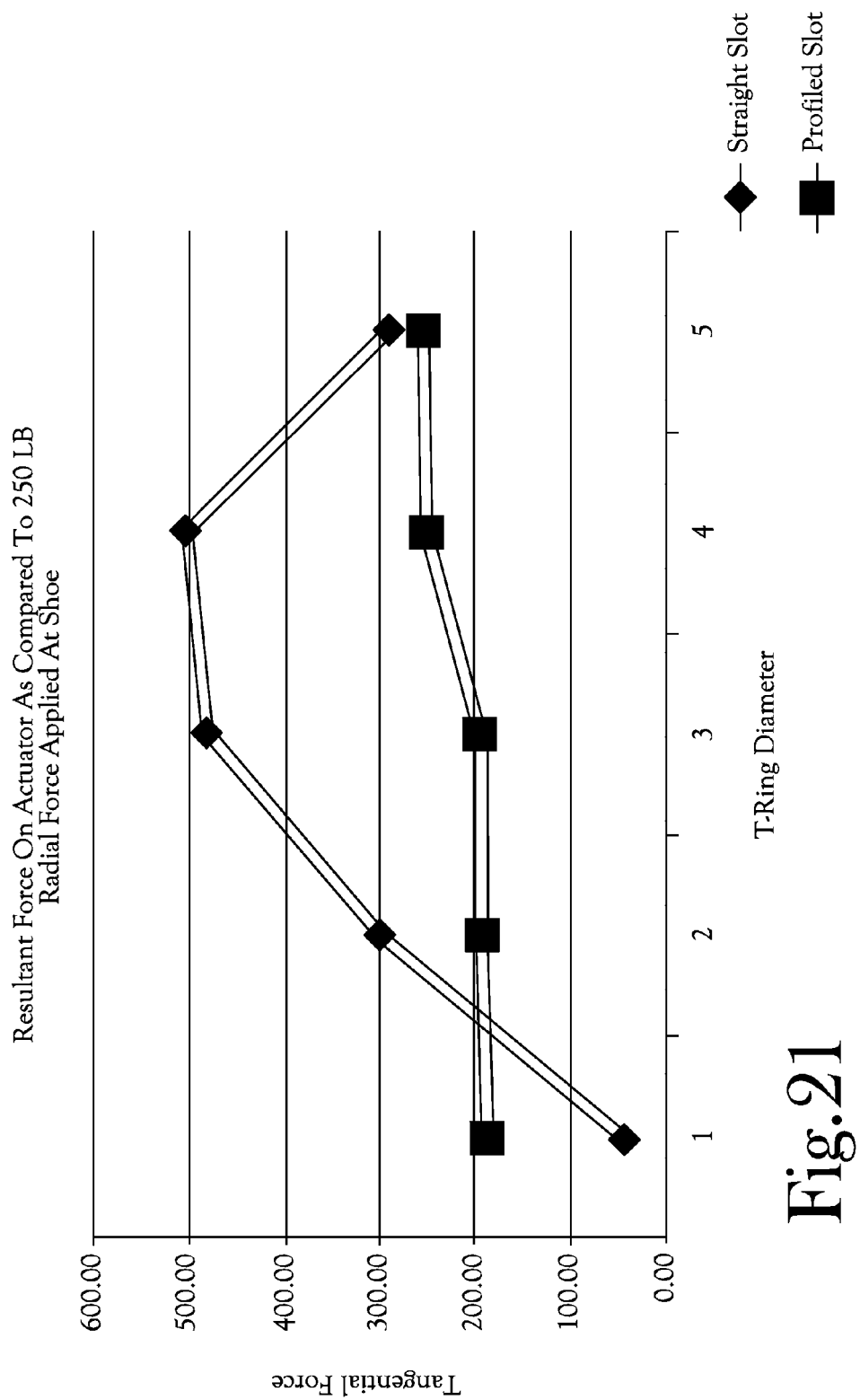
FIG. 21 is a chart comparing the forces experienced by a power source during operation of a transfer ring having straight camming grooves and a transfer ring of the present invention having curved camming grooves (See FIGS. 2, 3, and 17).

In light of the above, FIG. 20 depicts one embodiment of a transfer ring 10' employing a straight camming groove 54' on each of the driven links 44'. Like components of the embodiment of FIG. 18 are designated with primed numerals in FIG. 20. Whereas this embodiment is useful for enhancing the speed at which the driven links 44' of the transfer ring 10' may be increased, it will be understood that, employing a given power source, the straight camming groove embodiment of FIG. 20 requires a more powerful power source for resisting given radial forces 156' than the embodiment 10 employing the curved camming groove 54. For example, FIG. 21 geographically displays the resultant force on the power source 86 of a straight camming groove 54' (FIG. 20) and the present curved camming groove 54 of the present invention when a 250 pound outward radial force is applied to the shoes 37 of the respective transfer rings. As shown in FIG. 21, it will be noted that the curved camming groove 54 of the transfer ring 10 of the present invention materially lessens the radial force which must be opposed by the power source 86 of the present invention as the 250 pound radially outward force is applied to the shoes 37.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A transfer ring comprising:
   first and second circular frame members disposed in fixed, side by side, registered, and spaced apart relationship to one another, each said circular frame member defining a substantially planar side surface;
   a circular drive member defining a central axis, said drive member being rotatably mounted about said central axis in parallel-planar relationship along said first frame member side surface;
   a plurality of cam followers extending from said drive member;
   a plurality of hinge pin connectors, each said hinge pin connector extending perpendicularly between said first and second circular frame members and being of a length adapted to rigidly maintain said fixed, side by side, registered, and spaced apart relationship of said first and second circular frame members;
   a plurality of elongated driven links having opposite first and second ends thereof, each said driven link first end being rotatably mounted to one of said respective hinge pin connectors such that said each said driven link is rotatable between a contracted position with said driven link second ends extending toward said central axis and a retracted position with said driven link second ends extending along said circular frame members, each said driven link defining a curved, elongated camming groove extending along at least a portion of said driven link, each said cam follower being received within one of said camming grooves; and
   a plurality of shoes having inner surfaces facing substantially radially inwardly toward said central axis to collectively define a substantially circular gripping surface, each said shoe being rotatably mounted on one of said driven link second ends;
   whereby rotation of said drive member about said central axis moves said cam followers about said central axis and along said respective camming grooves, thereby rotating each said driven link about said respective hinge pin connector to alter a diameter of said gripping surface between said contracted position and said retracted position.

2. The transfer ring of claim 1, said hinge pin connectors being disposed at spaced locations about respective perimeter margins of said frame members.

3. The transfer ring of claim 1, said central axis of said drive member being coincident with central axes of said first and second frame members.

4. The transfer ring of claim 1, each said shoe inner surface being restrained against rotation in relation to an adjacent shoe inner surface, thereby ensuring retention of said circular orientation of said shoe inner surfaces between said contracted and retracted positions.

5. The transfer ring of claim 4, each said shoe defining first and second grooves, each said first groove having a first end of a rigid rod received therein, each said rod defining an opposite second end extending into a second groove of an adjacent shoe, said rods and associated grooves being configured to allow expansion and contraction of said gripping surface while restraining each said shoe inner surface against rotation in relation to an adjacent shoe inner surface.

6. The transfer ring of claim 1 further including a power source operatively connected to said circular drive member for at least limited oscillating rotation of said circular drive member between said contracted and retracted positions.

7. The transfer ring of claim 6, said power source including a double-acting piston/cylinder device configured to extend and retract a piston rod.

8. The transfer ring of claim 7, said double-acting piston/cylinder device being fastened to said frame members and said piston rod being fastened to said drive member.

9. The transfer ring of claim 1, wherein said curved shape of each said camming groove has a concavity facing said central axis when said respective driven link is in said retracted position.

10. The transfer ring of claim 9, each said camming groove being of a length such that said cam follower reaches a first end of said camming groove at said contracted position and a second end of said camming groove at said retracted position.

* * * * *